Patented Dec. 13, 1927.

1,652,339

UNITED STATES PATENT OFFICE.

FRANZ ZERNIK, OF BERLIN, GERMANY.

INSECTICIDE.

No Drawing. Application filed May 19, 1923, Serial No. 640,227, and in Germany May 26, 1922.

It has been found that elemental sulphur is soluble in esters having an antiparasitic effect and thus essentially increases the efficiency of such substances. The solubility of sulphur in such esters was not to be foreseen, for as solvent agents for sulphur there were known hitherto only ordinary hydrocarbons, chlorinated and sulphurated hydrocarbons, as for instance sulphuret of carbon, monochloride of sulphur, furthermore alcohol, ether, aniline, coal-tar-oil and terpenes.

It is already known that by the addition of sulphur the effect of antiparasitic medicaments is increased, the effect of sulphur being the more energetical the more the sulphur is distributed. For this reason the sulphur has been added to such medicaments either in colloidal form, or organic sulphur-compositions have been employed from which the sulphur is gradually freed by the organism itself. In both cases a relatively high amount of sulphur was required in order that the organism might bring into solution the amount necessary for the therapeutical effect.

According to the present invention only a very small amount of sulphur is necessitated, because by dissolving the sulphur in esters having an antiparasitic effect, such as benzoate of benzylic-alcohol, mononaphthenate of ethylene glycole, cinnamate of benzylic-alcohol, benzoate of cinnamylic-alcohol etc. the sulphur is presented in dissolved form to the organism.

*Examples.*

1. 1,5 g. sulphur are dissolved in 98,5 g. benzoate of benzylic-alcohol by heating.
2. 0,75 g. sulphur are dissolved in 99,25 g. mononaphthenate of ethylene glycole.

What I claim is:—

1. As an insecticide an ester of an organic acid with an organic base having an antiparasitic effect containing elemental sulfur in solution therein.

2. As an insecticide an antiparasitic ester of an alcohol and an aromatic carboxylic acid containing elemental sulphur in solution therein.

3. As an insecticide an antiparasitic mono ester of an alcohol and an aromatic carboxylic acid containing elemental sulphur in solution therein.

In testimony whereof, I affix my signature.

DR. FRANZ ZERNIK.

CERTIFICATE OF CORRECTION.

Patent No. 1,652,339.  Granted December 13, 1927, to

FRANZ ZERNIK.

It is hereby certified that error appears in the printed specification of the above numbered patent requiring correction as follows: Line 16, after the word "more" second occurrence insert the word "finely"; and that the said Letters Patent should be read with this correction therein that the same may conform to the record of the case in the Patent Office.

Signed and sealed this 24th day of January, A. D. 1928.

Seal.

M. J. Moore,
Acting Commissioner of Patents.